(12) United States Patent
Nishihara et al.

(10) Patent No.: US 9,037,760 B2
(45) Date of Patent: May 19, 2015

(54) INFORMATION PROCESSING APPARATUS AND COMPUTER PROGRAM PRODUCT

(75) Inventors: Yoshito Nishihara, Kanagawa (JP); Daisuke Tamashima, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 560 days.

(21) Appl. No.: 13/362,200

(22) Filed: Jan. 31, 2012

(65) Prior Publication Data

US 2012/0203940 A1 Aug. 9, 2012

(30) Foreign Application Priority Data

Feb. 9, 2011 (JP) .................................. 2011-026559
Jan. 6, 2012 (JP) .................................. 2012-001429

(51) Int. Cl.
*H04N 1/00* (2006.01)
*G06F 13/38* (2006.01)
*G06F 13/26* (2006.01)
*G06F 13/24* (2006.01)

(52) U.S. Cl.
CPC .......... *H04N 1/00127* (2013.01); *G06F 13/385* (2013.01); *G06F 13/26* (2013.01); *G06F 13/24* (2013.01)

(58) Field of Classification Search
None
See application file for complete search history.

(56) References Cited

U.S. PATENT DOCUMENTS

| 7,284,246 | B2 | 10/2007 | Kemp et al. |
| 2003/0043396 | A1* | 3/2003 | Klosterman et al. .......... 358/1.13 |
| 2003/0200427 | A1 | 10/2003 | Kemp et al. |
| 2005/0165979 | A1* | 7/2005 | Kato .............................. 710/15 |
| 2008/0010646 | A1 | 1/2008 | Kemp et al. |
| 2008/0228983 | A1 | 9/2008 | Nishihara |
| 2009/0179991 | A1 | 7/2009 | Mohammad |
| 2010/0177334 | A1 | 7/2010 | Nishihara |
| 2010/0238494 | A1 | 9/2010 | Araki |
| 2010/0309519 | A1 | 12/2010 | Nishihara |
| 2011/0063661 | A1 | 3/2011 | Nishihara |
| 2011/0267628 | A1 | 11/2011 | Nishihara |

FOREIGN PATENT DOCUMENTS

| CN | 100435092 C | 11/2008 |
| CN | 101894003 A | 11/2010 |
| EP | 1 357 471 A2 | 10/2003 |

(Continued)

OTHER PUBLICATIONS

The Extended European Search Report issued Sep. 3, 2012, in Application No. / Patent No. 12153087.7-1228.

(Continued)

*Primary Examiner* — Idriss N Alrobaye
*Assistant Examiner* — Dayton Lewis-Taylor
(74) *Attorney, Agent, or Firm* — Oblon, McClelland, Maier & Neustadt, L.L.P.

(57) ABSTRACT

An information processing apparatus includes a core unit configured to control an external device that is communicatively connected to the information processing apparatus; and a calling unit that is included in the core unit and is configured to call a plug-in that enables the external device to implement a predetermined function when controlling the external device. The plug-in, when called by the calling unit at a specific timing, interrupts a process related to the control of the external device performed by the core unit with a process related to the predetermined function provided by the plug-in.

18 Claims, 17 Drawing Sheets

(56) References Cited

FOREIGN PATENT DOCUMENTS

| | | |
|---|---|---|
| EP | 2 079 224 A1 | 7/2009 |
| JP | 3745344 | 12/2005 |
| JP | 2007-219576 | 8/2007 |
| JP | 2009-171579 | 7/2009 |

OTHER PUBLICATIONS

Chinese Office Action issued Jul. 3, 2014, in China Patent Application No. 201210027626.2 (with English translation).

* cited by examiner

```
{
  "Plugin1":
  {
    "priority":"30"
  },
  "Plugin2":
  {
    "priority":"50"
  },
  "Plugin3":
  {
    "priority":"30"
  },
  "Plugin4":
  {
    "priority":"70"
  }
}
```

FIG.15

```
{
  "Plugin1":
  {
    "display":"default"
  },
  "Plugin2":
  {
    "display":"default"
  },
  "Plugin3":
  {
    "display":"store"
  },
  "Plugin4":
  {
    "display":"default"
  }
}
```

INFORMATION PROCESSING APPARATUS AND COMPUTER PROGRAM PRODUCT

CROSS-REFERENCE TO RELATED APPLICATIONS

The present application claims priority to and incorporates by reference the entire contents of Japanese Patent Application No. 2011-026559 filed in Japan on Feb. 9, 2011 and Japanese Patent Application No. 2012-001429 filed in Japan on Jan. 6, 2012.

BACKGROUND OF THE INVENTION

1. Field of the Invention

The present invention relates to an information processing apparatus and a computer program product.

2. Description of the Related Art

A system is known in which an information processing apparatus such as a personal computer (PC) is connected to a printer such as a multifunction peripheral (MFP), where the printer performs printing under the control of the information processing apparatus. The information processing apparatus controls the printer by executing a program such as a printer driver. The printer driver has a plug-in mechanism including a core portion and a plug-in portion, enabling addition or deletion of functions by adding or deleting plug-ins after installation.

The printer driver has a function for hooking a process at a predetermined timing during a print sequence, such as at the start of a printing process, the start or end of document printing, or the start or end of page printing. For example, in Windows (registered trademark), which is an operation system (OS) developed by Microsoft Corporation of the USA, the hooking function is provided as a function called "DocumentEvent". However, in the conventional printer driver, a process related to "DocumentEvent" that hooks a process at a predetermined timing is performed only in the core portion. Therefore, when there is a change or a difference in the process related to "DocumentEvent", it is necessary to re-develop not only the plug-in portion but also the core portion, resulting in an increase in development burden.

Examples of the related art include Japanese Patent No. 3745344 and Japanese Patent Application Laid-open No. 2009-171579.

Therefore, there is a need for an information processing apparatus capable of restraining development cost.

SUMMARY OF THE INVENTION

According to an embodiment, there is provided an information processing apparatus that includes a core unit configured to control an external device that is communicatively connected to the information processing apparatus; and a calling unit that is included in the core unit and is configured to call a plug-in that enables the external device to implement a predetermined function when controlling the external device. The plug-in, when called by the calling unit at a specific timing, interrupts a process related to the control of the external device performed by the core unit with a process related to the predetermined function provided by the plug-in.

According to another embodiment, there is provided a computer program product including a non-transitory computer readable medium including programmed instructions. The instructions, when executed by a computer for controlling an external device communicatively connected thereto, cause the computer to execute calling a plug-in that enables the external device to implement a predetermined function when controlling the external device; and causing the plug-in that is called in the calling at a specific timing to interrupt a process related to the control of the external device with a process related to the predetermined function provided by the plug-in.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a sequence diagram of an example of an operation performed by the printer driver according to the first embodiment;

FIG. 9 illustrates an example of a priority file according to the second embodiment;

FIG. 11 illustrates an example of reflecting a setting of a plug-in that has been called in a next plug-in;

FIG. 12 illustrates an example of reflecting the setting of the plug-in that has been called in the next plug-in;

FIG. 13 illustrates an example of reflecting the setting of the plug-in that has been called in the next plug-in;

FIG. 15 illustrates an example of a setting file according to the third embodiment;

DETAILED DESCRIPTION OF THE PREFERRED EMBODIMENTS

In the following, various embodiments will be described in detail with reference to the drawings. In the following description, a printer system will be described by way of example in which a personal computer (PC) is used as an information processing apparatus and a printer is used as an external device.

First Embodiment

Figure 1:
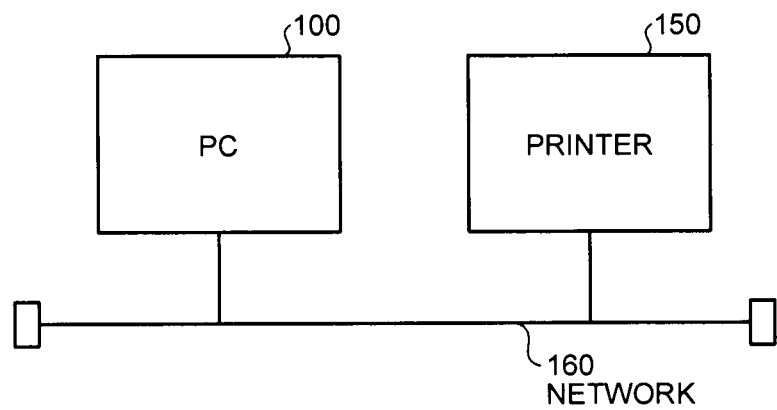
FIG. 1 is a block diagram of an entire structure of a printer system according to a first embodiment.

FIG. 1 is a block diagram illustrating an entire structure of the printer system according to the present embodiment. As illustrated in FIG. 1, in the printer system, a PC 100 as the information processing apparatus and a printer 150 as the external device are connected to each other via a network 160. In the printer system, the printer 150 operates under the control of the PC 100. For example, the printer 150 performs a printing process in accordance with a print request from the PC 100. While in the present embodiment the printer 150 is described as an example of the external device, the type of the external device is not particularly limited and may be a scanner or the like.

Figure 2:
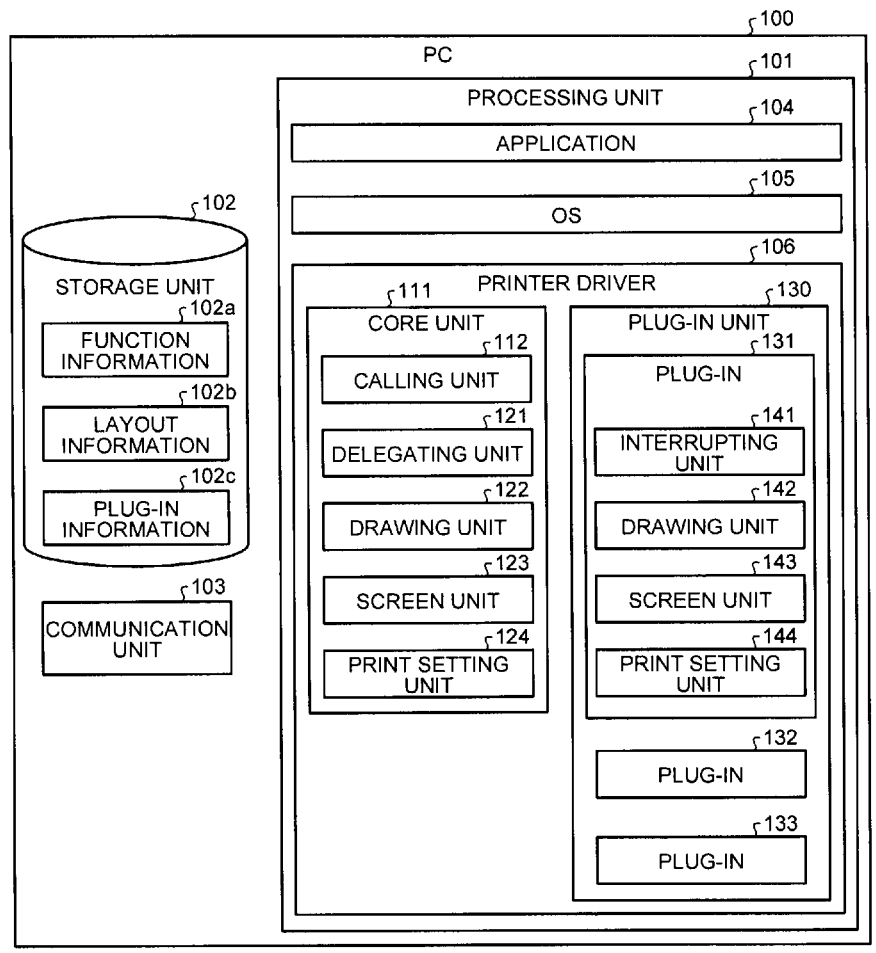
FIG. 2 is a block diagram schematically illustrating a functional structure of a PC according to the first embodiment.

FIG. 2 is a block diagram schematically illustrating a functional structure of the PC 100. As illustrated in FIG. 2, the PC 100 includes a processing unit 101, a storage unit 102, and a communication unit 103. Specifically, the PC 100 includes a hardware structure utilizing a conventional computer which may include an input device such as a keyboard and mouse, and a display device such as a display unit (see FIG. 20). The processing unit 101 includes a central processing unit (CPU) and memories which may include a read only memory (ROM) and a random access memory (RAM) as main memory. Upon start-up or during an operation of the PC 100, programs of an application 104, an OS 105, and various drivers (of which only a printer driver 106 is illustrated in FIG. 2) may be loaded from the ROM or the storage unit 102 onto the main memory and expanded to be executed by the CPU.

The storage unit 102 may include a hard disk drive (HDD) and stores therein various kinds of information. The information stored in the storage unit 102 includes setting information that defines information related to processes for implementing predetermined functions of a core unit 111 of the printer driver 106 and plug-ins (such as plug-ins 131 to 133 in FIG. 2) in a plug-in unit 130 (i.e., all of the information necessary for the processes, such as setting values used in a process and display information for modifying the setting values). Examples of the setting information include function information 102a, layout information 102b, and plug-in information 102c. The plug-in information 102c may not be included in the setting information.

The function information 102a describes information related to the function of the printer driver 106, such as a settable range of each setting value and matching between settings. The layout information 102b describes a method of display of each setting or a display position. Specifically, the layout information 102b describes a layout of graphical user interface (GUI) components displayed on a setting screen. The plug-in information 102c describes information about the plug-ins in the plug-in unit 130, such as the name of each plug-in, the function provided by the plug-in, internal structure information of the plug-in, and information referenced within the plug-in. The plug-in information 102c describes the name such as "double-side printing plug-in" or "user ID plug-in", and a code indicating a function such as "printing on both sides" and "user ID setting".

The communication unit 103 performs transmission and reception of information with the printer 150 connected via the network 160, as illustrated in FIG. 1. Specifically, the communication unit 103, under the control of the processing unit 101, may perform data communications by using a predetermined communication protocol via the network 160, which may be a local area network (LAN).

The application 104 is software allowing a user to enter a print instruction. When the user wishes to print data edited by using the application 104, the application 104 may accept a print instruction from the user. In this case, the application 104 does not generate print data for the printer 150 but delivers print target data to the OS 105 together with a print request corresponding to the print instruction.

The operating system (OS) 105 is software for managing the hardware and software of the PC 100. The OS 105 controls the starting-up of a program and reading or storing of information. Examples of the OS include MS Windows (registered trademark) and UNIX (registered trademark). According to the present embodiment, the OS 105 is Windows (registered trademark) developed by Microsoft Corporation of the USA. It goes without saying that any other OS's may be used as long as they can embed the printer driver 106.

The printer driver 106 is software that controls the printer 150 communicatively connected via the network 160, by using the communication unit 103. The printer driver 106 includes the core unit 111 and the plug-in unit 130.

The core unit 111 includes a delegating unit 121, a drawing unit 122, a screen unit 123, a print setting unit 124, and a calling unit 112, and provides standard functions of the printer driver 106. The delegating unit 121, the drawing unit 122, the screen unit 123, and the print setting unit 124 are a group of modules providing the standard functions of the printer driver 106. In the core unit 111, general-purpose processes that do not involve processing differences due to differences in apparatus type or page description language (PDL), for example, are implemented.

The calling unit 112 calls a plug-in, such as the plug-in 131, 132, or 133 in the plug-in unit 130. The calling unit 112, in accordance with an instruction from the core unit 111 (the delegating unit 121, the drawing unit 122, the screen unit 123, or the print setting unit 124), queries the plug-ins 131, 132, and 133, identifies the plug-in having the function for implementing the instruction, calls the identified plug-in, and notifies the plug-in of the instruction. Specifically, the calling unit 112 identifies, from interfaces supported by the plug-ins 131, 132, and 133, the plug-in having the interface corresponding to the instruction, and notifies the identified plug-in of the instruction via the corresponding interface. Alternatively, the calling unit 112 may identify the plug-in having the function for implementing the instruction by referring to the plug-in information 102c, call the plug-in, and notify the plug-in of the instruction.

The plug-ins 131, 132, and 133 of the plug-in unit 130 are implemented by a dynamic link library (DLL) for adding a function to the core unit 111. Specifically, each of the plug-ins of the plug-in unit 130 can be implemented by storing a DLL file for the plug-in in a predetermined area of the storage unit 102. Each of the plug-ins 131, 132, and 133 includes one or more modules, like the core unit 111, in order to enable the printer 150 to implement a predetermined function. In the example of FIG. 2, the plug-in 131 includes four modules; namely, an interrupting unit 141, a drawing unit 142, a screen unit 143, and a print setting unit 144. Each of the plug-ins 132 and 133 also includes one or more modules. The functions that the printer 150 is enabled to implement by the plug-ins of the plug-in unit 130 may be a function for compulsorily making the printer 150 perform double-side printing (see a double-side compulsory plug-in 134 in FIG. 4) and a function for causing the printer 150 to perform printing by setting a user ID in the printer 150 (see a user ID plug-in 135 in FIG. 6).

The plug-in unit 130 is capable of including plural plug-ins, such as the plug-ins 131, 132, and 133. In the example of FIG. 2, the plug-in unit 130 includes the three plug-ins 131 to 133. Thus, the printer driver 106 provides the functions of the plug-ins 131 to 133 in addition to the standard functions of the core unit 111. Namely, in the printer driver 106, a plug-in can be added in the plug-in unit 130 by adding (or installing) a DLL file for the plug-in in a predetermined area of the storage unit 102. This makes it possible to provide functions other than the general-purpose process functions of the core unit 111.

Next, the details of the group of modules illustrated in the core unit 111 and the plug-in unit 130 by way of example (i.e., the delegating unit 121, the interrupting unit 141, the drawing units 122 and 142, the screen units 123 and 143, and the print setting units 124 and 144) will be described.

The delegating unit 121 and the interrupting unit 141 perform a process of "DocumentEvent" by which a process is hooked at a predetermined timing (such as at the start of a printing process, the start or end of document printing, or the start or end of page printing) during a process sequence (print sequence) of the printer driver 106 based on data, such as the plug-in information 102c. Specifically, the delegating unit 121 of the core unit 111 delegates the above-described process to the interrupting unit 141 of the plug-in 131 via the calling unit 112. The interrupting unit 141 of the plug-in 131, upon being called by the delegating unit 121 of the core unit 111 via the calling unit 112, is delegated with the process of the core unit 111 by the process of "DocumentEvent". The interrupting unit 141, when the timing of delegation of the process from the delegating unit 121 corresponds to the timing of performing the function provided by the plug-in 131 (which is an example of a specific timing), interrupts a current process to start the process related to that function. Thus, the plug-in 131 can perform a process for causing the printer 150 to implement the function provided by the plug-in 131.

The drawing units 122 and 142 perform a drawing process in the printer driver 106 based on data such as the function information 102a and the plug-in information 102c. Specifically, the drawing units 122 and 142 convert the data, which is requested by the application 104 to be printed, into a print instruction that the printer 150 can interpret, and transmit the converted print instruction to the printer 150 via the communication unit 103. For example, when depending on the function provided by the plug-in 131, the drawing unit 122 calls the plug-in 131 via the calling unit 112 and causes the drawing unit 142 to perform a drawing process. The drawing unit 142 performs a drawing process similar to the drawing process of the drawing unit 122 when the timing of reception of the call from the calling unit 112 corresponds to the timing of performing the function provided by the plug-in 131. The process performed by the drawing unit 142 includes a process performed in the case where the drawing unit 142 generates the print instruction and a process performed in the case where the drawing unit 142 calls (calls back) an API corresponding to the drawing unit 122 so that the drawing unit 122 generates the print instruction. In an example of call-back, when a line is to be drawn, the line can be drawn on a document by executing a LineTo function of the drawing unit 122.

The screen units 123 and 143, based on data such as the layout information 102b and the plug-in information 102c, displays a print setting screen providing a GUI for print setting to the user. Specifically, the screen unit 123 of the core unit 111 displays a GUI for operating a setting value of a general-purpose function in the printer driver 106. The screen unit 123, when displaying a GUI for operating a setting value for the function provided by the plug-in 131, calls the plug-in 131 via the calling unit 112 and requests the screen unit 143 to display the GUI. In response to the call from the calling unit 112, the screen unit 143 displays the GUI.

The print setting units 124 and 144, based on data such as the function information 102a and the plug-in information 102c, makes a print setting for the printer driver 106 to cause the printer 150 to perform printing. Specifically, the print setting units 124 and 144 stores or retrieves a setting value of a print setting, and performs matching process. The print setting unit 124 stores or retrieves a setting value of a general-purpose function supported by the core unit 111, and performs the matching process. When making a print setting for the function provided by the plug-in 131, for example, the print setting unit 124 calls the plug-in 131 via the calling unit 112 and requests the print setting unit 144 to make a setting. In response to the call from the calling unit 112, the print setting unit 144 stores or retrieves the setting value of the print setting for the function provided by the plug-in 131, or performs the matching process.

Figure 3:
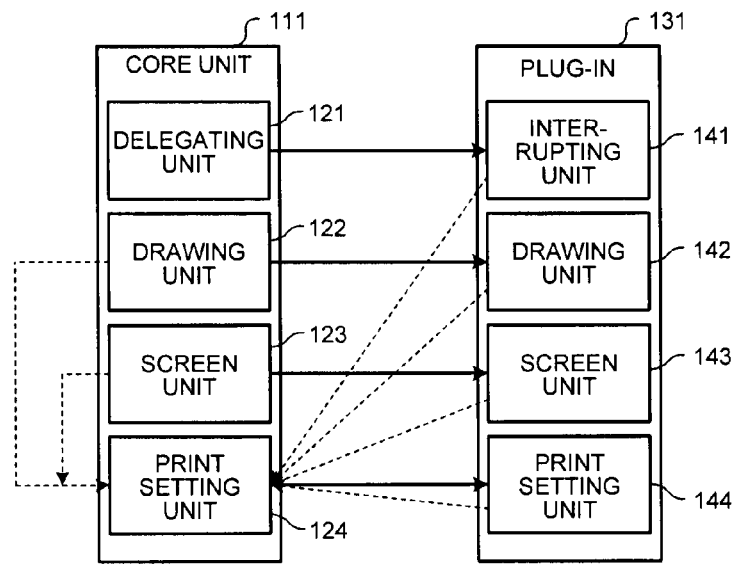
FIG. 3 is a block diagram illustrating a relationship between a core driver and a plug-in according to the first embodiment.

FIG. 3 is a block diagram of an example of the relationship between the core unit 111 and the plug-in 131. In FIG. 3, solid line arrows indicate calls to the plug-in 131 from the core unit 111 via the calling unit 112. Broken line arrows indicate calls within the core unit 111 and calls to the core unit 111 from the plug-in 131.

As illustrated in FIG. 3, when the core unit 111 controls the printer 150, a module of the plug-in 131 (the interrupting unit 141, the drawing unit 142, the screen unit 143, or the print setting unit 144) is called via the calling unit 112. Because the print setting unit 124 of the core unit 111 is a window for acquiring a print setting or making a setting, the print setting unit 124 can be called from almost all of the modules. The details of the call are as described above.

The delegating unit 121 of the core unit 111, as regards the process related to the plug-in 131, delegates the process by calling the interrupting unit 141. Thus, the delegating unit 121 does not make a call to the print setting unit 124. The print setting unit 144 of the plug-in 131, in order to perform the matching process of the functions provided by the plug-in 131, may require, in some cases, a setting value of a general-purpose function provided by the core unit 111, or a setting value of the function provided by another plug-in. Thus, the print setting unit 144 of the plug-in 131 may make, in some cases, a call to the print setting unit 124 of the core unit 111.

In the plug-in 131, as in the core unit 111, the modules of the interrupting unit 141, the drawing unit 142, the screen unit 143, and the print setting unit 144 are logically independent from each other. Thus, it is not desirable even for the modules within the plug-in 131 to directly operate the print setting unit 144 of the plug-in 131. Accordingly, all of the modules of the plug-in 131 are allowed to call the print setting unit 124 of the core unit 111. When acquiring or making a print setting, the modules of the plug-in 131 acquire or set a setting value via the print setting unit 124 of the core unit 111 even if the setting value is for the function provided by the plug-in 131 itself.

Figure 4:
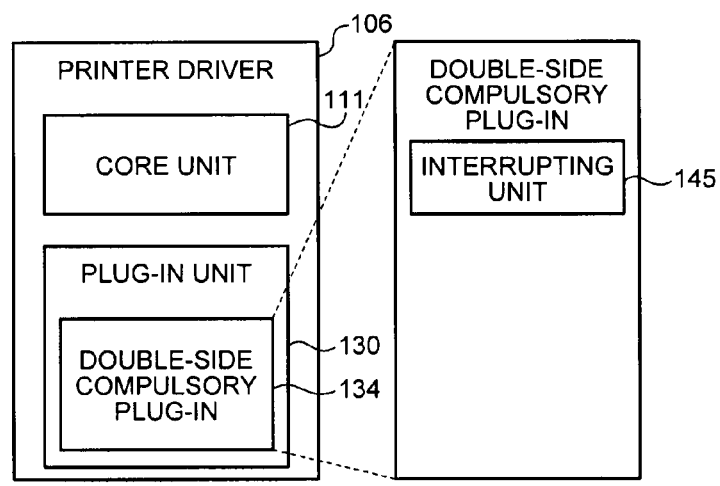
FIG. 4 is a block diagram of a concrete example of a printer driver according to the first embodiment.

Next, a concrete example of the printer driver 106 will be described. FIG. 4 is a block diagram of a concrete structure of the printer driver 106. As illustrated in FIG. 4, the printer driver 106 includes the double-side compulsory plug-in 134 in the plug-in unit 130. The double-side compulsory plug-in 134 enables the printer 150 to implement the following functions.

(i) Compulsorily print on both sides;
(ii) When double-side printing is turned off, display a warning notice informing the user of that fact at the start of printing; and (iii) Allow the user to decide on a warning notice screen whether to print on both sides or end printing.

The double-side compulsory plug-in 134, in order to enable the printer 150 to implement the above functions, includes an interrupting unit 145 for hooking at least a process of the printer driver 106.

Figure 5:
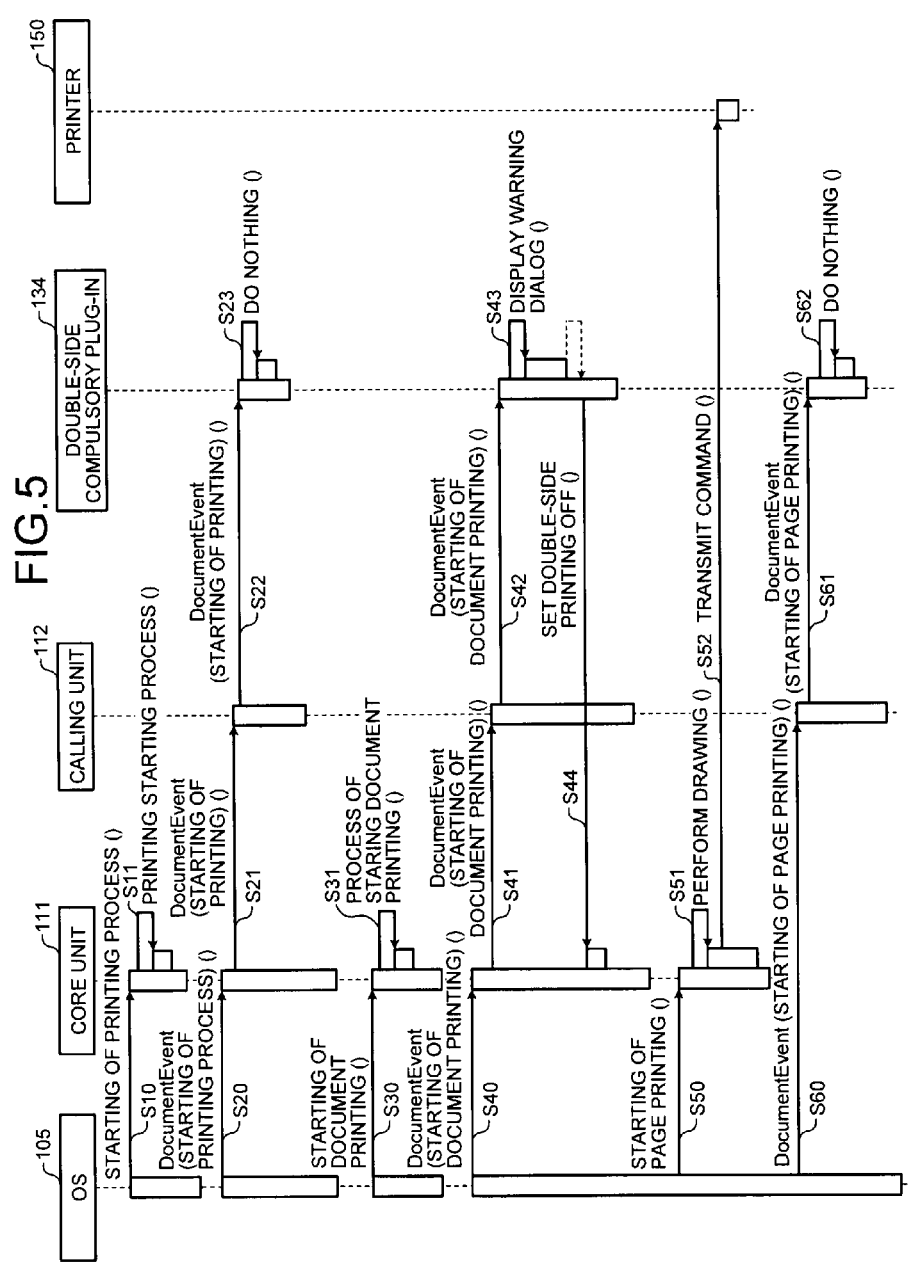

Next, an operation of the printer driver 106 having the double-side compulsory plug-in 134 will be described. FIG. 5 is a sequence diagram of an operation performed by the printer driver 106. As illustrated in FIG. 5, first, in response to the start of a printing process from the OS 105 (S10), the core unit 111 starts the printing process (S11). Then, in response to a notification of "DocumentEvent" (starting of printing process) from the OS 105 (S20), the delegating unit 121 of the core unit 111 delegates the process of "DocumentEvent" (starting of printing) to the double-side compulsory plug-in 134 via the calling unit 112 (S21, S22). As a result, the process of staring printing is delegated from the core unit 111 to the interrupting unit 145 of the double-side compulsory plug-in 134. However, the time of starting of printing does not correspond to the timing for the double-side compulsory plug-in 134 to perform any process. Thus, the interrupting unit 145 does not hook the process of starting printing (i.e., does not interrupt the process of starting of printing with any process) and does not perform any process (S23).

Then, in response to the starting of document printing from the OS 105 (S30), the core unit 111 performs a document printing start process (S31). Then, in response to the notification of "DocumentEvent" (document printing start) from the OS 105 (S40), the delegating unit 121 of the core unit 111 delegates, via the calling unit 112, the process of "DocumentEvent" (document printing start) to the double-side compulsory plug-in 134 (S41, S42). Thus, the document printing start process is delegated to the interrupting unit 145 of the double-side compulsory plug-in 134 from the core unit 111. Because the time of starting of document printing corresponds to the timing for the double-side compulsory plug-in 134 to perform the process for compulsorily printing on both sides, the interrupting unit 145 interrupts the process of "DocumentEvent" (document printing start) with a process of displaying a warning dialog and a process of receiving a decision from the user as to whether double-side printing is to be performed or printing is to be ended (i.e., the interrupting unit 145 hooks these processes) (S43). When a decision that double-side printing is not to be performed is received, the interrupting unit 145 calls the print setting unit 124 of the core unit 111, and the double-side printing is set to be "OFF" (S44).

Then, in response to the start of page printing from the OS 105 (S50), the core unit 111 performs a drawing process in the drawing unit 122 (S51), and transmits a print instruction (command) generated by the drawing process to the printer 150 (S52). Thereafter, a page printing process (S60, S61, and S62) following the "DocumentEvent" (start of page printing) is performed.

Figure 6:
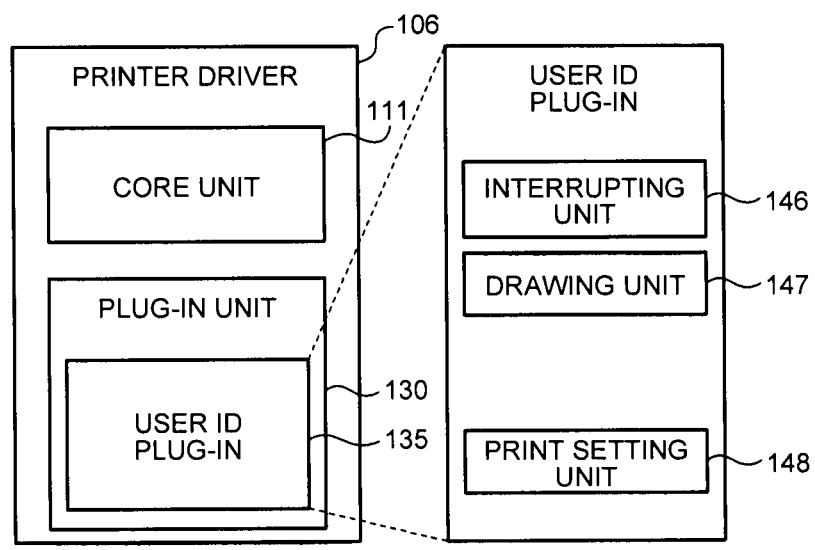
FIG. 6 is a block diagram of an example of a concrete structure of the printer driver according to the first embodiment.

Another concrete example of the printer driver 106 will be described which is different from the above example including the double-side compulsory plug-in 134. FIG. 6 is a block diagram of the concrete example of the printer driver 106. As illustrated in FIG. 6, the printer driver 106 includes the user ID plug-in 135 in the plug-in unit 130. The user ID plug-in 135 enables the printer 150 to implement the following functions.

(i) Display a dialog allowing the input of a user ID at the start of printing; and (ii) Transmit the input user ID to the printer 150 as a command (print instruction).

The user ID plug-in 135, in order to enable the printer 150 to implement the above functions, includes an interrupting unit 146 for hooking at least a process of the printer driver 106. The user ID plug-in 135 also includes a drawing unit 147 and a print setting unit 148, in addition to the interrupting unit 146.

Figure 7:
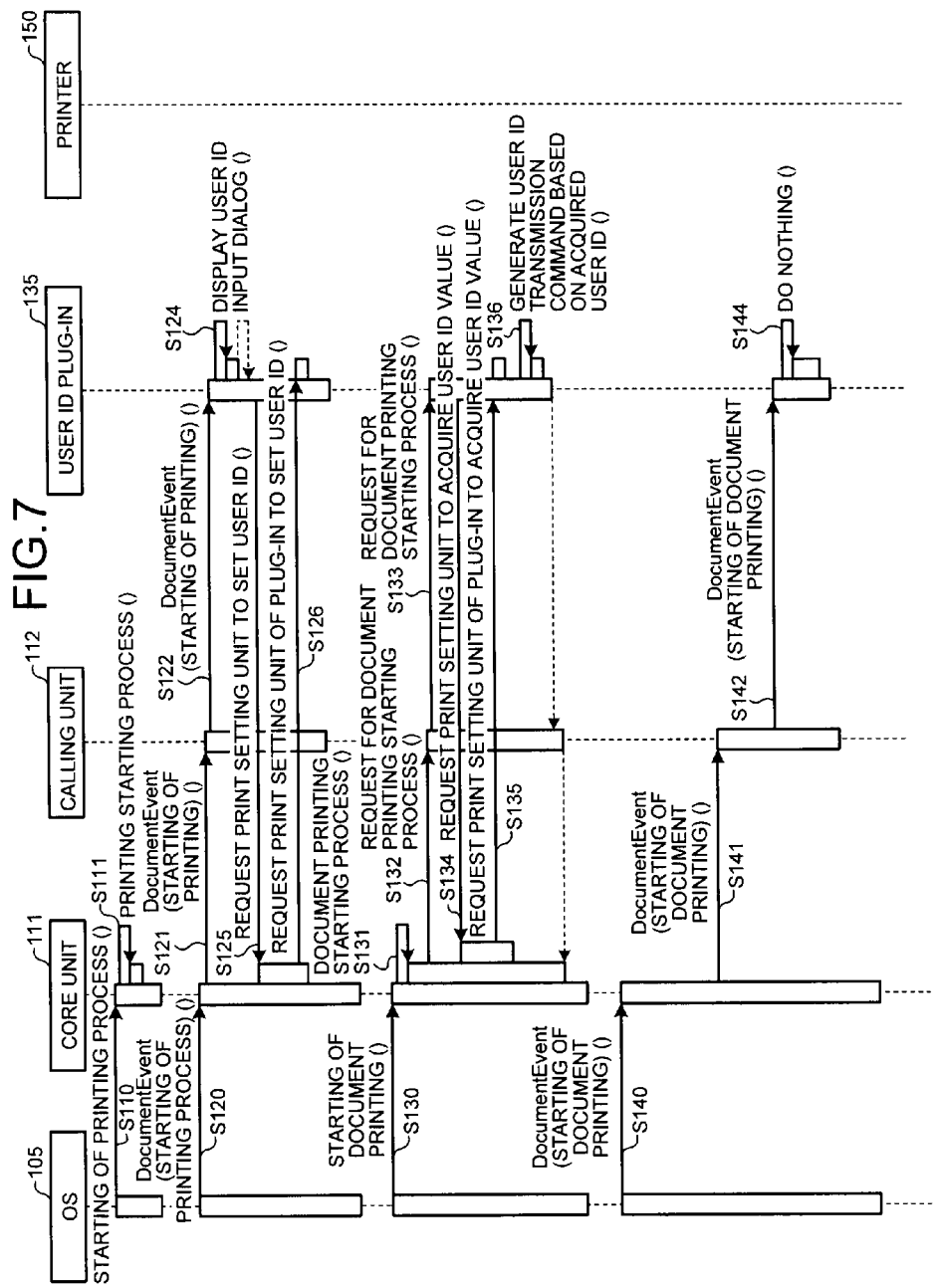
FIG. 7 is a sequence diagram of an example of the operation performed by the printer driver according to the first embodiment.

Next, an operation of the printer driver 106 including the user ID plug-in 135 will be described. FIG. 7 is a sequence diagram of an operation performed by the printer driver 106. As illustrated in FIG. 7, in response to the start of a printing process from the OS 105 (S110), the core unit 111 starts the printing process (S111). Then, in response to the notification of "DocumentEvent" (starting of printing process) from the OS 105 (S120), the delegating unit 121 of the core unit 111 delegates, via the calling unit 112, the process of "DocumentEvent" (starting of printing) to the user ID plug-in 135 (S121, S122). As a result, the interrupting unit 146 of the user ID plug-in 135 is delegated with the process of starting of printing from the core unit 111. Because the time of starting of printing corresponds to the timing for the user ID plug-in 135 to perform a process related to a user ID, the interrupting unit 146 interrupts the process of "DocumentEvent" (starting of printing) with a process of displaying the user ID input dialog and a process of receiving the input of a user ID (i.e., the interrupting unit 146 hooks these processes) (S124).

Then, the interrupting unit 146 of the user ID plug-in 135 calls the print setting unit 124 of the core unit 111 and requests the setting of the user ID (S125). Thereafter, the print setting unit 124 of the core unit 111 calls the print setting unit 148 of the user ID plug-in 135 via the calling unit 112, and requests the setting of the user ID (S126). In this way, the print setting unit 148 is prevented from being directly called within the user ID plug-in 135.

Thereafter, in response to the starting of document printing from the OS 105 (S130), the core unit 111 performs a process of starting document printing (S131). Then, the drawing unit 122 of the core unit 111 requests, via the calling unit 112, the user ID plug-in 135 to perform the process of starting document printing (S132, S133). Then, the drawing unit 147 of the user ID plug-in 135 requests the print setting unit 124 of the core unit 111 to acquire a user ID value (S134). Then, the print setting unit 124 of the core unit 111 requests, via the calling unit 112, the print setting unit 148 of the user ID plug-in 135 to acquire the user ID value (S135). As a result, the drawing unit 147 of the user ID plug-in 135 generates a user ID transmission command based on the user ID acquired by the print setting unit 148 (S136). Thereafter, a printing process (S140, S141, and S142) following the "DocumentEvent" (starting of document printing) is performed. Because the time of starting of document printing does not correspond to the timing for the user ID plug-in 135 to perform any process, the interrupting unit 146 does not hook the process of starting document printing (i.e., does not interrupt the process of staring document printing with any process) and does not perform any process (S144).

As described above, the PC 100 includes the core unit 111 configured to control the printer 150 that is communicatively connected to the PC 100. The core unit 111 includes the calling unit 112 configured to, when controlling the printer 150, call a plug-in that enables the printer 150 to implement a predetermined function. The plug-in, when called by the calling unit 112 at a predetermined timing, interrupts the process related to the control of the printer 150 performed by the core unit 111 with a process related to the predetermined function provided by the plug-in. Thus, when there is a change or a difference in a process related to "DocumentEvent" in the printer driver 106, only the plug-in needs to be replaced. In this way, the need for redevelopment of the core unit 111 can be eliminated, so that the development burden and development cost can be reduced.

Second Embodiment

In a second embodiment, an example is described in which, in the case where a process is hooked by calling plural plug-ins in sequence, a determination is made, based on an already-called plug-in, as to whether a next plug-in is to be called. In the following, differences from the first embodiment will be mainly described, with constituent elements having functions similar to those of the first embodiment being designated with similar names or signs and their description is omitted.

Figure 8:
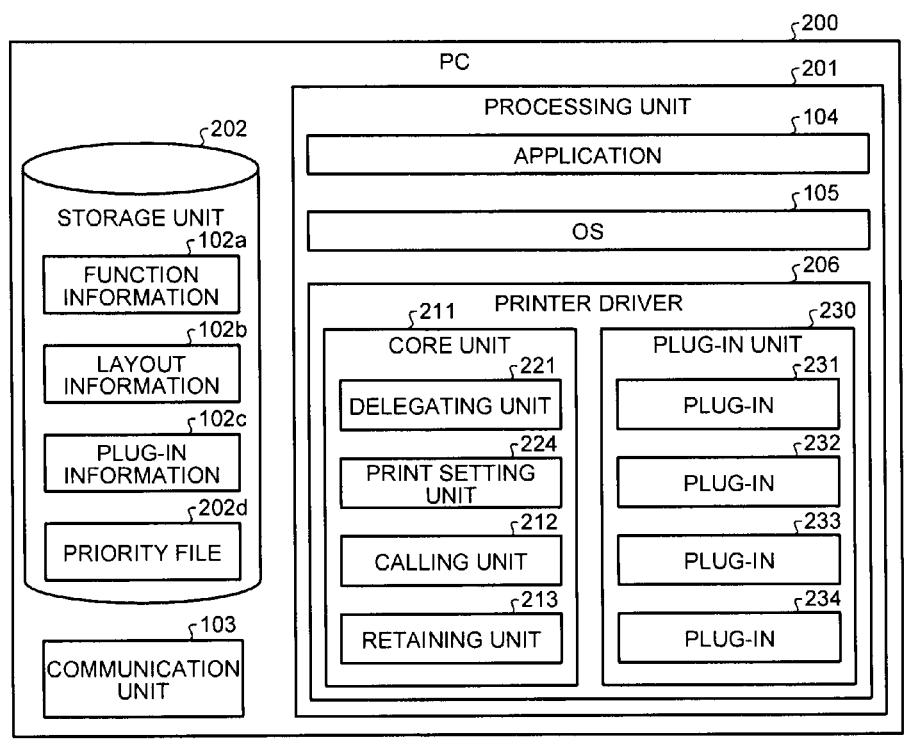
FIG. 8 is a block diagram schematically illustrating a functional structure of a PC according to a second embodiment.

FIG. 8 is a block diagram schematically illustrating a functional structure of a PC 200 according to the second embodiment. As illustrated in FIG. 8, the PC 200 according to the second embodiment differs from the PC 100 according to the first embodiment in a printer driver 206 in a processing unit 201 and a storage unit 202.

The printer driver 206 includes a core unit 211 and a plug-in unit 230. The core unit 211 includes a delegating unit 221, a print setting unit 224, a calling unit 212, and a retaining unit 213. In the second embodiment, the core unit 211 may include a drawing unit and a screen unit, which are not illustrated in connection with the second embodiment. The plug-in unit 230 includes plug-ins 231 to 234. The plug-ins included in the plug-in unit 230 are not limited to the plug-ins 231 to 234.

The storage unit 202 further stores therein a priority file 202d (an example of priority information). The priority file 202d includes a file that defines a priority degree of each of the plug-ins 231 to 234 of the plug-in unit 230.

FIG. 9 illustrates an example of the priority file 202d. In the example of FIG. 9, the priority of Plugin1 to Plugin4 is defined in JSON format. Plugin1 to Plugin4 correspond to the plug-ins 231 to 234, respectively, with higher priority values indicating higher priority.

The delegating unit 221, in a process sequence (print sequence) performed by the printer driver 206, sends a plug-in calling instruction to the calling unit 212 at a predetermined timing (such as at the start of a printing process, the start or end of document printing, or the start or end of page printing). The delegating unit 221 delegates the above-described process to the plug-in called by the calling unit 212.

Upon reception of a notification of completion of the plug-in calling instruction from the calling unit 212, the delegating unit 221 instructs the retaining unit 213 to reflect a print setting retained therein in the print setting unit 224 (in other words, the delegating unit 221 issues a "reflecting instruction" to the retaining unit).

Upon reception of the plug-in calling instruction from the delegating unit 221, the calling unit 212 identifies a plug-in having the function for implementing the instruction. In this example, the calling unit 212 identifies the plug-ins 231 to 234 and, further, determines that the plug-ins 231 to 234 are to be called in this order. When thus calling the plural plug-ins in order, the calling unit 212 determines whether the next plug-in is to be called based on the already-called plug-in.

Specifically, the calling unit 212 determines whether the next plug-in is to be called, based on at least one of cancel information indicating whether the already-called plug-in has been canceled and the priority file 202d. The cancel information is stored in RAM by the plug-ins 231 to 234, as will be described in detail later.

For example, when the priority of the next plug-in is higher than the priority of an already-called plug-in that has been cancelled, the calling unit 212 determines that the next plug-in is to be called, and calls the next plug-in. On the other hand, when the priority of the next plug-in is lower than the priority of an already-called plug-in that has been cancelled, the calling unit 212 determines that the next plug-in is not to be called, and does not call the next plug-in.

Suppose that, when the calling unit 212 calls the plug-ins 231 to 234 in order, the plug-in 232 is cancelled. In this case, the calling unit 212 determines that the plug-in 233 is not to be called because the plug-in 233 has the priority "30" while the already-called plug-in 232 that has been cancelled has the priority "50" (see FIG. 9). On the other hand, the plug-in 234 has the priority "70" and the already-called plug-in 232 that has been cancelled has the priority "50" (see FIG. 9), so that the calling unit 212 determines that the plug-in 234 is to be called.

After completing the plug-in calling instruction from the delegating unit 221, the calling unit 212 sends a completion notification to the delegating unit 221.

The plug-ins 231 to 234 are called by the delegating unit 221 via the calling unit 212 and, if the timing is for performing an interrupting process, hooks a process of displaying a print setting screen (see FIG. 11, for example) enabling the selection of "OK" or "cancel" with regard to a print setting; a process of causing the retaining unit 213 to retain the print setting corresponding to the content selected by the user ("OK" or "cancel"); and a process of storing cancel information in RAM. The cancel information indicates no cancelling if "OK" is selected by the user or cancelling if "cancel" is selected by the user. Alternatively, the plug-ins 231 to 234, instead of storing the cancel information in RAM, may return the cancel information to the calling unit 212 as a return value.

The retaining unit 213 retains the print settings of the plug-ins 231 to 234. The retaining unit 213, when the delegating unit 221 issues the reflecting instruction, reflects the retained print setting in the print setting unit 224.

Figure 10:
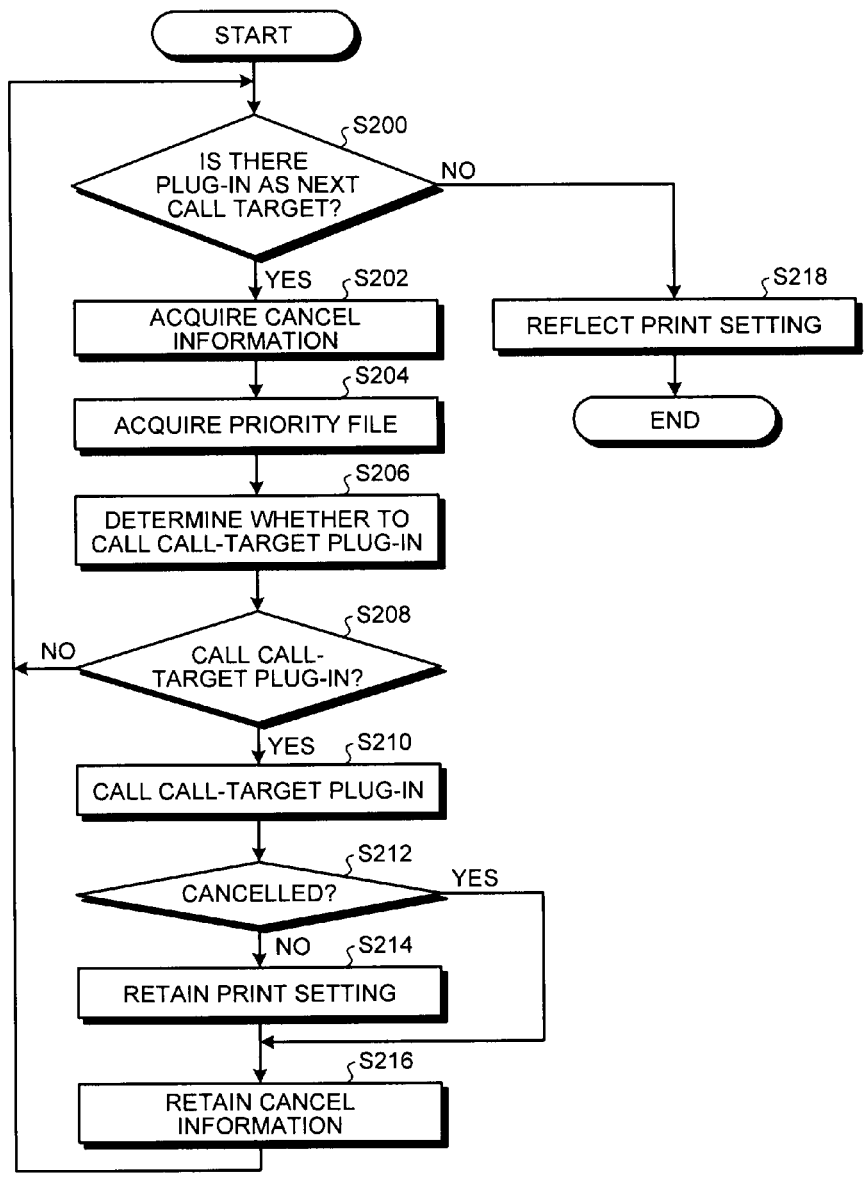
FIG. 10 is a flowchart of an example of an operation performed by a printer driver according to the second embodiment.

FIG. 10 is a flowchart of an operation performed by the printer driver 206.

First, the calling unit 212, upon reception of a plug-in calling instruction from the delegating unit 221, identifies the plug-in having the function of implementing the instruction and determines whether there is a plug-in as a next call target (step S200).

When there is the plug-in as the next call target ("Yes" in step S200), the calling unit 212 acquires the cancel information from RAM (step S202) and acquires the priority file 202d from the storage unit 202 (step S204).

Then, the calling unit 212 refers to the cancel information and the priority file 202d and, based on the priority of the cancelled plug-in and the priority of the plug-in as the call target, determines whether the call target plug-in is to be called (step S206).

When the calling unit 212 determines that the call target plug-in is not to be called ("No" in step S208), the process returns to step S200. On the other hand, when the calling unit 212 determines that the call target plug-in is to be called ("Yes" in step S208), the calling unit 212 calls the plug-in of the call target (step S210).

Then, the called plug-in displays the print setting screen. When "OK" is selected by the user ("No" in step S212), the plug-in causes the retaining unit 213 to retain the okayed print setting (step S214) and stores the cancel information indicating no cancelling of its own in RAM (step S216), and the process returns to step S200.

On the other hand, when "cancel" is selected by the user ("Yes" in step S212), the plug-in that has been called stores the cancel information indicating its own cancelling in RAM (step S216), and the process returns to step S200. In this case, the print setting of the called plug-in is not retained in the retaining unit 213.

When there is no plug-in as a call target ("No" in step S200), the calling unit 212 sends a completion notification to the delegating unit 221. The delegating unit 221 then issues the reflecting instruction to the retaining unit 213. The retaining unit 213 reflects the retained print setting in the print setting unit 224 (step S218).

As described above, according to the second embodiment, in the case where process is hooked by calling plural plug-ins in sequence at a specific timing, even if any of the plug-ins is cancelled, one or more of the remaining plug-ins that satisfy certain conditions can be called. Accordingly, the settings of the plural plug-ins can be matched.

While in the second embodiment the next plug-in is called when the priority of the next plug-in is higher than the priority of the called plug-in that is cancelled, this is merely an example and does not limit the present invention.

For example, when there is a cancelled plug-in among the called plug-ins, calling of the subsequent plug-ins and printing may be cancelled. In this case, the calling unit 212 may refer to the cancel information and, if the cancel information indicates cancelling, cancel the calling of the subsequent plug-ins and notify the delegating unit 221 of cancellation of printing. In this case, the PC 200 may not have the priority file 202d stored in the storage unit 202.

Further, for example, when there is a cancelled plug-in among the called plug-ins, the calling of the subsequent plug-ins may be cancelled and printing may be performed with the print setting of the plug-in up to this point in time. In this case, the calling unit 212 may refer to the cancel information and, if the cancel information indicates cancelling, cancel the calling of the subsequent plug-ins and send a completion notification to the delegating unit 221. In this case, too, the PC 200 may not have the priority file 202d stored in the storage unit 202.

Further, for example, when there is a cancelled plug-in among the called plug-ins, the calling of the subsequent plug-ins may be cancelled and printing may be performed by invalidating (initializing) the print setting of the plug-in up to this point in time. In this case, the calling unit 212 may refer to the cancel information and, if the cancel information indicates cancelling, cancel the calling of the subsequent plug-ins and send a completion notification to the delegating unit 221. The delegating unit 221 may then instruct the retaining unit 213 to discard the print setting. In this example, too, the PC 200 may not have the priority file 202d stored in the storage unit 202.

Further, for example, even when there is a cancelled plug-in among the called plug-ins, the subsequent plug-ins may be called in order. In this case, the calling unit 212 may call the plug-ins in order. In this case, too, the PC 200 may not have the priority file 202d stored in the storage unit 202, and the plug-ins may not store the cancel information in the RAM.

Third Embodiment

In a third embodiment, an example will be described in which, in the case where a process is hooked by calling plural plug-ins in order, the setting of an already-called plug-in is reflected in the next plug-in. In the following, differences from the second embodiment will be mainly described, with the constituent elements having functions similar to those of the second embodiment being designated with similar names or signs and their description is omitted.

Figure 11:
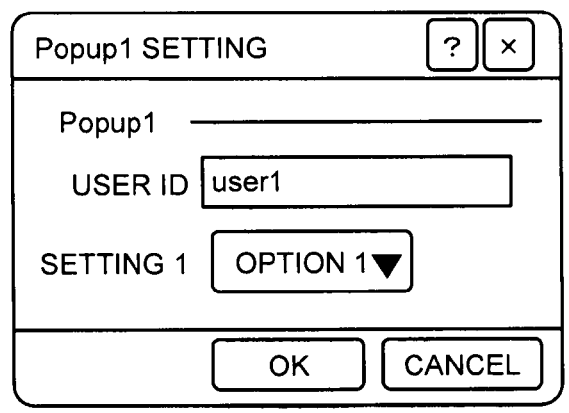
Figure 12:
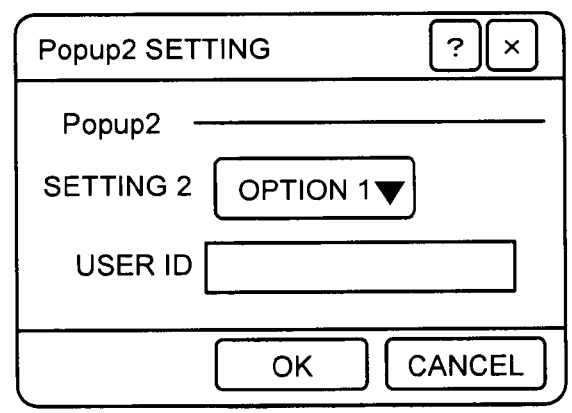
Figure 13:
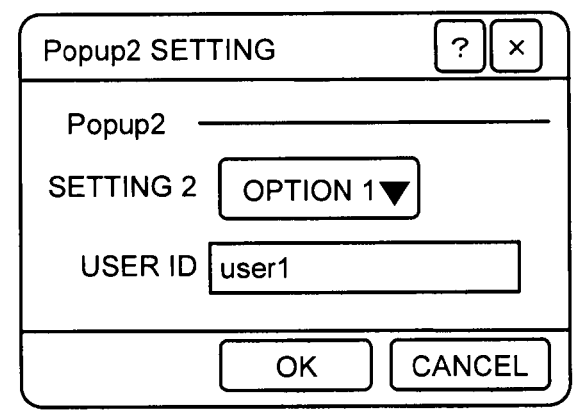

FIGS. 11 to 13 illustrate the example in which the setting of a called plug-in is reflected in the next plug-in. In this example, two plug-ins are called successively. When the first plug-in is called, the first plug-in displays a print setting screen for setting a user ID and a setting 1, as illustrated in FIG. 11, and receives a setting by the user. Then, when the second plug-in is called, the plug-in displays a print setting screen for setting a user ID and a setting 2, as illustrated in FIG. 12. Normally, the user ID set by the first plug-in is not reflected on the print setting screen displayed by the second plug-in. In contrast, in accordance with the third embodiment, when the second plug-in is called, the second plug-in displays the print setting screen by reflecting the user ID set by the first plug-in, as illustrated in FIG. 13.

Figure 14:
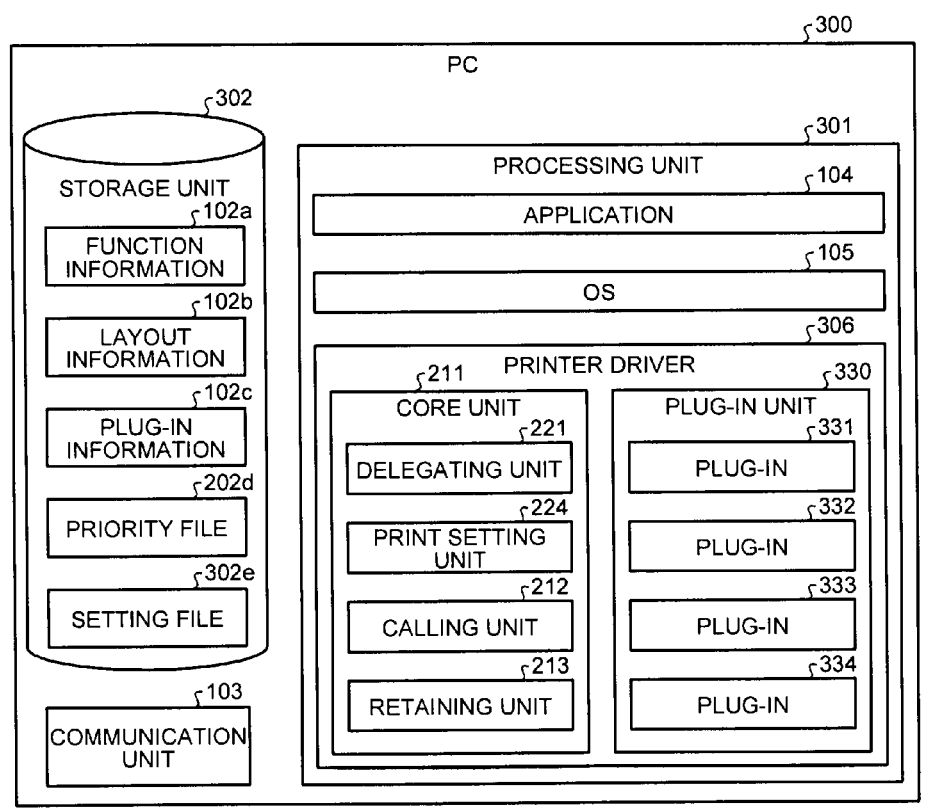
FIG. 14 is a block diagram schematically illustrating a functional structure of a PC according to a third embodiment.

FIG. 14 is a block diagram schematically illustrating a functional structure of a PC 300 according to the third embodiment. As illustrated in FIG. 14, the PC 300 according to the third embodiment differs from the PC 200 of the second embodiment in a printer driver 306 and a storage unit 302 of a processing unit 301.

A plug-in unit 330 of the printer driver 306 includes plug-ins 331 to 334. The plug-ins included in the plug-in unit 330 are not limited to the plug-ins 331 to 334.

In the storage unit 302, a setting file 302e (which is an example of setting reflecting information) is further stored. The setting file 302e includes a file that defines whether the setting of a called plug-in is to be reflected in the plug-ins 331 to 334 of the plug-in unit 330.

FIG. 15 illustrates an example of the setting file 302e. In the example of FIG. 15, "display" (indicating whether the setting of a called plug-in is reflected) of Plugin1 to Plugin4 is defined in JSON format. Plugin1 to Plugin4 correspond to the plug-ins 331 to 334, respectively. A value "default" in "display" indicates that a default display is made without reflecting the setting set by the called plug-in. A value "store" in "display" indicates that display is made by reflecting the setting set by the called plug-in.

When any of the plug-ins 331 to 334 is called by the delegating unit 221 via the calling unit 212, if the timing is for performing an interrupting process, a process related to a predetermined function provided by its corresponding plug-in is hooked after reflecting the setting set by the already-called plug-in.

Specifically, the plug-in refers to the setting file 302e and, when the value of "display" of the plug-in is "store", acquires the setting retained in the retaining unit 213, and hooks a process for displaying the print setting screen reflecting the acquired setting; a process for causing the retaining unit 213 to retain a print setting corresponding to the content selected by the user; and a process of storing cancel information in RAM. For example, the plug-in, as illustrated in FIG. 13, acquires the setting of the user ID retained in the retaining unit 213, and displays the print setting screen reflecting the setting of the acquired user ID.

On the other hand, the plug-in refers to the setting file 302e and, when the value of "display" of the plug-in is "default", hooks a process of displaying the print setting screen in which the setting retained in the retaining unit 213 is not reflected; a process of causing the retaining unit 213 to retain the print setting corresponding to the content selected by the user; and a process of storing cancel information in RAM. For example, the plug-in displays the print setting screen in which the setting of the user ID retained in the retaining unit 213 is not reflected, as illustrated in FIG. 12.

As described above, according to the third embodiment, in the case where a process is hooked by calling plural plug-ins in order at a specific timing, the setting of a called plug-in may or may not be reflected in the next plug-in.

Fourth Embodiment

In a fourth embodiment, an example will be described in which, in the case where a process is hooked by calling plural plug-ins in order, settings for the same function, which are set by the plural plug-ins, are matched. In the following, differences from the second embodiment will be mainly described, with the constituent elements having functions similar to those of the second embodiment being designated with similar names or signs and their description is omitted.

Figure 16:
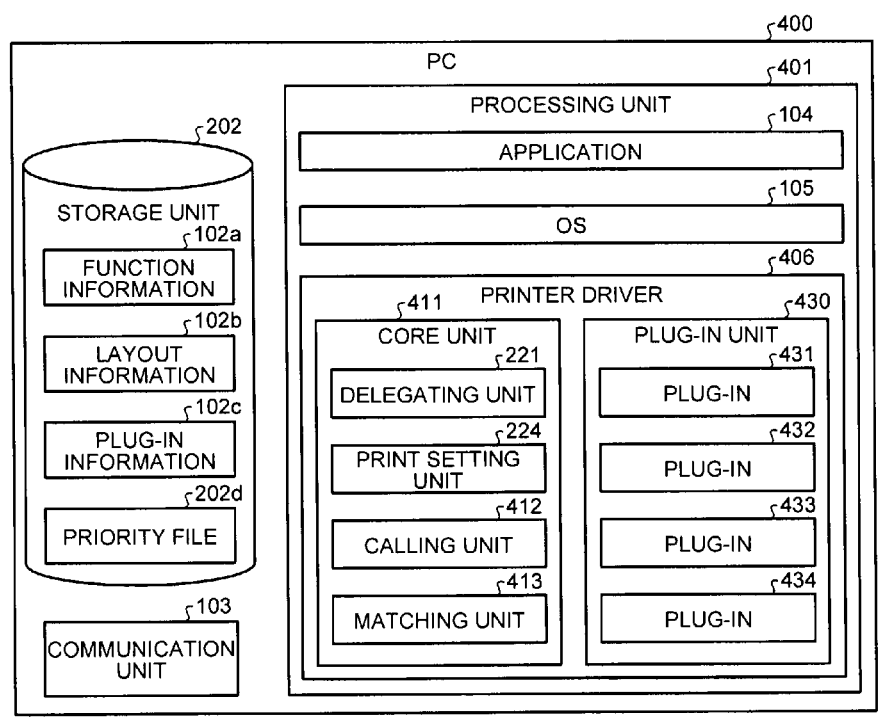
FIG. 16 is a block diagram schematically illustrating a functional structure of a PC according to a fourth embodiment.

FIG. 16 is a block diagram schematically illustrating a functional structure of a PC 400 according to the fourth embodiment. As illustrated in FIG. 16, the PC 400 of the fourth embodiment differs from the PC 200 of the second embodiment in a printer driver 406 of a processing unit 401.

The printer driver 406 includes a core unit 411 and a plug-in unit 430. The core unit 211 includes the delegating unit 221, the print setting unit 224, a calling unit 412, and a matching unit 413. The plug-in unit 430 includes plug-ins 431 to 434. The plug-ins included in the plug-in unit 430 are not limited to the plug-ins 431 to 434.

The calling unit 412, upon reception of a plug-in calling instruction from the delegating unit 221, identifies a plug-in having the function for implementing the instruction. In this example, the calling unit 412 identifies the plug-ins 431 to 434, determines that the plug-ins are to be called in order of the plug-ins 431 to 434, and calls the plug-ins 431 to 434 in order. The calling unit 412, upon completion of the plug-in calling instruction from the delegating unit 221, sends a completion notification to the delegating unit 221.

The plug-ins 431 to 434 are called by the delegating unit 221 via the calling unit 412. When the timing is for performing an interrupting process, the plug-ins make a setting for a predetermined function and hook a process of causing the matching unit 413 to retain the setting. In this example, the plug-ins 431 to 434 make print settings for the same function. Specifically, each of the plug-ins 431 to 434 sets a user ID. Thus, the plug-ins 431 to 434 are called by the delegating unit 221 via the calling unit 112 and, if the timing is for performing an interrupting process, the plug-ins hook a process of displaying a print setting screen for setting the user ID and a process of causing the retaining unit 213 to retain the user ID that has been set.

The matching unit 413 retains the settings set by the plug-ins 431 to 434 after matching the settings. Specifically, the matching unit 413 matches the settings set by the plug-ins 431 to 434 based on the priority file 202d and retains the matched setting.

For example, when the priority of a plug-in called by the calling unit 412 is higher than the priority of the plug-in whose setting is retained, the matching unit 413 overwrites the retained setting with the setting set by the plug-in called by the calling unit 412. On the other hand, when the priority of the plug-in called by the calling unit 412 is lower than the priority of the plug-in whose setting is retained, the matching unit 413 retains the retained setting as is.

When the calling unit 412 calls the plug-ins 431 to 434 in order, the matching unit 413 first retains the setting of the user ID of the plug-in 431. Then, because the priority of the plug-in 432 is "50" and the priority of the plug-in 431 whose user ID setting is retained is "30" (see FIG. 9), the matching unit 413 overwrites the retained user ID setting with the user ID setting of the plug-in 431. Then, with regard to the plug-in 433, because its priority is "30" while the priority of the plug-in 432 whose user ID setting is retained is "50" (see FIG. 9), the matching unit 413 retains the user ID setting as is. The matching unit 413 then overwrites the retained user ID setting with the user ID setting of the plug-in 434 because the priority of the plug-in 434 is "70" while the priority of the plug-in 432 whose user ID setting is retained is "50" (see FIG. 9). As a result, the various settings are matched into the user ID setting by the plug-in 434 having the highest priority.

The matching unit 413, when receiving the reflecting instruction from the delegating unit 221, reflects the matched print setting in the print setting unit 224.

Figure 17:
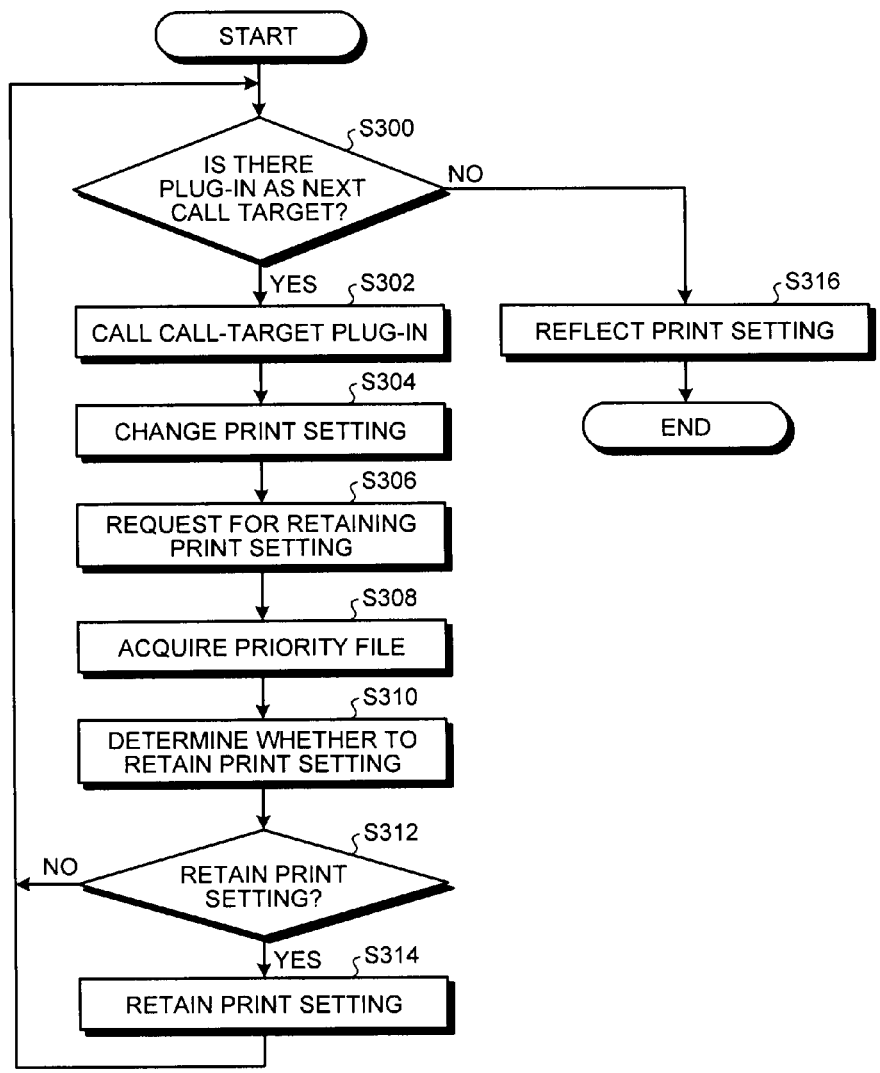
FIG. 17 is a flowchart of an example of an operation performed by a printer driver according to the fourth embodiment.

FIG. 17 is a flowchart of an operation of the printer driver 406.

First, the calling unit 412, upon reception of a plug-in calling instruction from the delegating unit 221, identifies a plug-in having the function for implementing the instruction, and determines whether there is a plug-in as a next call target (step S300).

When there is a call target plug-in ("Yes" in step S300), the calling unit 412 calls the call target plug-in (step S302).

Then, the called plug-in displays a print setting screen. When the print setting is changed by the user (for example, when a user ID is set) (step S304), the called plug-in requests the matching unit 413 to retain the print setting (step S306).

Then, the matching unit 413 acquires the priority file 202d from the storage unit 202 (step S308) and determines, based on the priority of the called plug-in and the priority of the plug-in whose print setting is retained, whether the print setting of the called plug-in is to be retained (i.e., whether the retained print setting is to be overwritten with the print setting of the called plug-in) (step S310).

When the print setting of the called plug-in is not to be retained ("No" in step S312), the process returns to step S300. On the other hand, when the print setting of the called plug-in is to be retained ("Yes" in step S312), the matching unit 413 retains the print setting of the called plug-in (step S314), and the process returns to step S300.

When there is no call target plug-in ("No" in step S300), the calling unit 412 sends a completion notification to the delegating unit 221. The delegating unit 221 then issues the reflecting instruction to the matching unit 413, and the matching unit 413 reflects the retained print setting in the print setting unit 224 (step S316).

As described above, according to the fourth embodiment, in the case where a process is hooked by calling plural plug-ins in order at a specific timing, settings can be matched even when the plural plug-ins make the settings for the same function.

In the fourth embodiment, an example has been described in which the setting of a called plug-in is retained when the priority of the called plug-in is higher than the priority of the plug-in whose setting has been retained. However, this is merely an example and does not limit the present invention.

For example, the setting of a later-called plug-in may be retained. In this case, the matching unit 413 may overwrite the retained setting with the setting of a plug-in each time the plug-in is set. In this example, the PC 400 may not have the priority file 202d stored in the storage unit 202.

Further, for example, the setting of an initially called plug-in may be retained. In this case, the matching unit 413 may discard the settings of the second and any subsequent plug-ins. In this case, too, the PC 400 may not have the priority file 202d stored in the storage unit 202.

Further, for example, when a setting is made in a different plug-in, a default setting may be resumed. In this case, in response to a request for retaining the setting of another plug-in when there is already a plug-in setting that is retained (i.e., in response to a call to another plug-in), the matching unit 413 may bring the retained setting back to the default setting.

Fifth Embodiment

In a fifth embodiment, an example will be described in which, in the case where a process is hooked by calling plural plug-ins in order, settings for functions having exclusive relationships, which are set by the plural plug-ins, are matched. In the following, differences from the second embodiment will be mainly described, with constituent elements having functions similar to those of the second embodiment being designated with names or signs similar to those by the second embodiment and their description is omitted.

Figure 18:
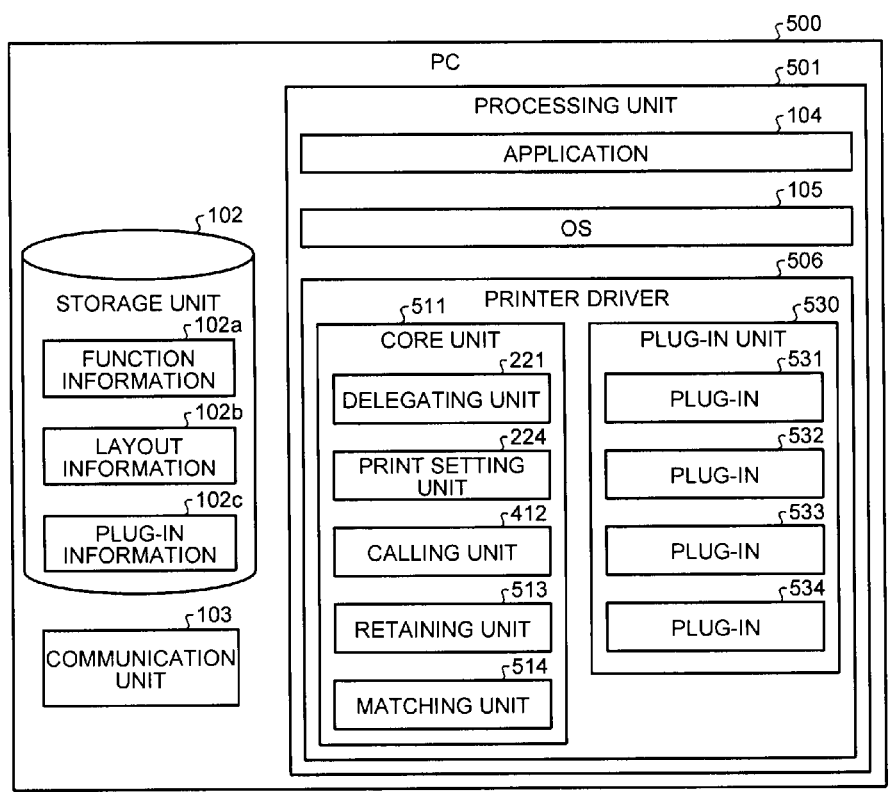
FIG. 18 is a block diagram schematically illustrating a functional structure of a PC according to a fifth embodiment.

FIG. 18 is a block diagram schematically illustrating a functional structure of a PC 500 according to the fifth embodiment. As illustrated in FIG. 18, the PC 500 according to the fifth embodiment differs from the PC 200 of the second embodiment in a printer driver 506 of a processing unit 501.

The printer driver 506 includes a core unit 511 and a plug-in unit 530. The core unit 511 includes a delegating unit 221, a print setting unit 224, the calling unit 412, a retaining unit 513, and a matching unit 514. The plug-in unit 530 includes plug-ins 531 to 534. However, the plug-ins included in the plug-in unit 530 are not limited to the plug-ins 531 to 534.

The calling unit 412, upon reception of a plug-in calling instruction from the delegating unit 221, identifies a plug-in having the function for implementing the instruction. In this example, the calling unit 412 identifies the plug-ins 531 to 534, determines that the plug-ins are to be called in order of the plug-ins 531 to 534, and calls the plug-ins 531 to 534 in order. The calling unit 412, upon completion of the plug-in calling instruction from the delegating unit 221, sends a completion notification to the delegating unit 221.

The plug-ins 531 to 534 are called by the delegating unit 221 via the calling unit 412 and, if the timing is for performing an interrupting process, the plug-ins make a setting for a predetermined function and hook a process of causing the retaining unit 513 to retain the setting. In this example, the plug-ins 531 to 534 make print settings for functions having exclusive relationships. Specifically, the plug-ins 531 to 534 make print settings for a staple function and a punch function which have an exclusive relationship. Specifically, at least one of the plug-ins 531 to 534 is called by the delegating unit 221 via the calling unit 412 and, if the timing is for performing an interrupting process, hooks a process of displaying a print setting screen for setting the staple function, and a process of causing the retaining unit 513 to retain the setting of the staple function. Similarly, at least one of the plug-ins 531 to 534 (which is different from the plug-in that sets the staple function) is called by the delegating unit 221 via the calling unit 412 and, if the timing is for performing an interrupting process, hooks a process of displaying a print setting screen for setting the punch function and a process of causing the retaining unit 513 to retain the setting for the punch function.

The retaining unit 513 retains a matched setting obtained by performing the matching process on the settings set by the plug-ins 531 to 534. Specifically, the retaining unit 513 sends, to the matching unit 514, the retained setting and the setting requested to be retained, and retains the matched setting on which a matching process has been performed by the matching unit 514. The retaining unit 513, when received the reflecting instruction from the delegating unit 221, reflects the retained matched print setting in the print setting unit 224.

The matching unit 514 performs the matching process on the settings set by the plural plug-ins according to a predetermined matching rule. Specifically, the matching unit 514, upon reception of the retained setting and the setting requested to be retain from the retaining unit 513, performs the matching process on these settings and returns the matched setting on which the matching process has been performed to the retaining unit 513. Here, the matching unit 514 has prioritized the functions provided by the plug-ins 531 to 534 in advance, and performs the matching process based on the priority.

For example, suppose that the staple function has higher priority than the punch function, and the matching unit 514 receives the retained setting in which "staple function: ON (punch function: OFF)" is set and the setting requested to be retained in which "punch function: ON (staple function: OFF)" is set. In this case, the matching unit 514 performs the matching process on the retained setting and the setting requested to be retained, and returns "staple function: ON (punch function: OFF)" as the setting on which the matching process has been performed to the retaining unit 513.

Figure 19:
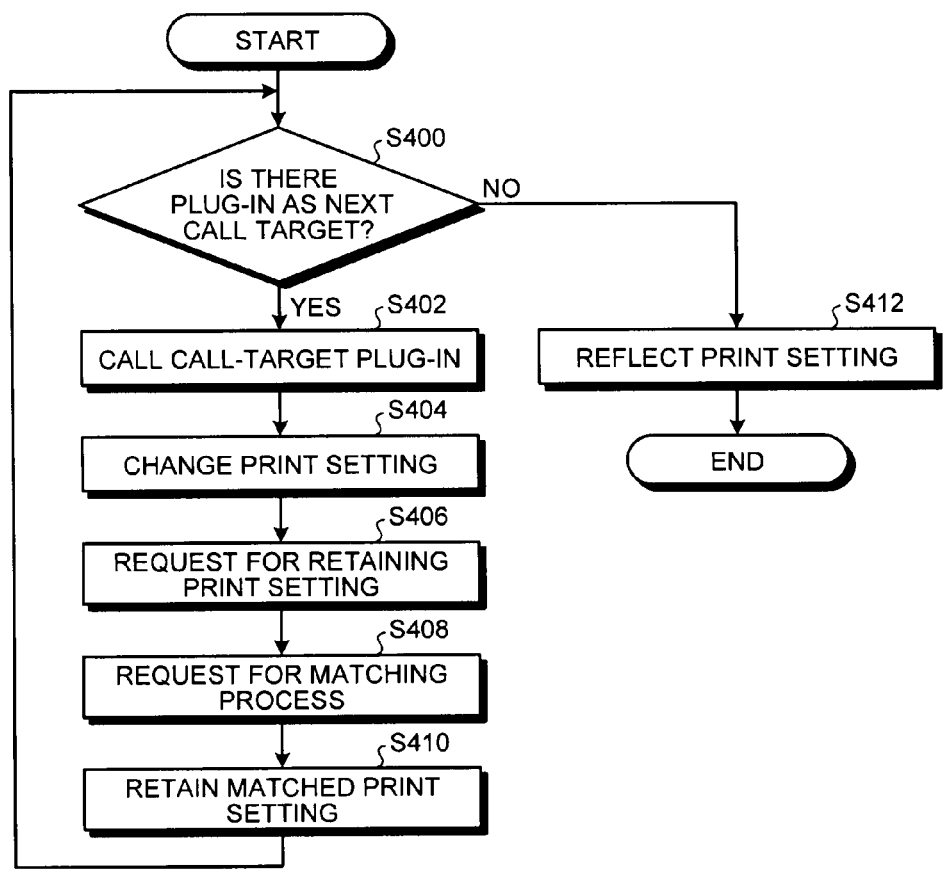
FIG. 19 is a flowchart of an example of an operation performed by a printer driver according to the fifth embodiment.

FIG. 19 is a flowchart of an operation performed by the printer driver 506.

First, the calling unit 412, upon reception of a plug-in calling instruction from the delegating unit 221, identifies a plug-in having the function for implementing the instruction, and determines whether there is a plug-in as a next call target (step S400).

When there is the call target plug-in ("Yes" in step S400), the calling unit 412 calls the call target plug-in (step S402).

Then, the called plug-in displays a print setting screen and, when the print setting is changed by the user (such as when the staple function or the punch function is set) (step S404), requests the retaining unit 513 to retain the print setting (step S406).

Thereafter, the retaining unit 513 sends an already-retained print setting and the print setting requested to be retained to the matching unit 514 and requests the matching process (step S408).

Then, the matching unit 514 performs the matching process on the retained print setting and the print setting requested to be retained. The retaining unit 513 then retains the matched print setting on which the matching process has been performed (step S410), and the process returns to step S400.

When there is no call target plug-in ("No" in step S400), the calling unit 412 sends a completion notification to the delegating unit 221. The delegating unit 221 issues the reflecting instruction to the retaining unit 513, and the retaining unit 513 reflects the retained matched print setting in the print setting unit 224 (step S412).

As described above, according to the fifth embodiment, in the case where a process is hooked by calling plural plug-ins in order at a specific timing, even when the plural plug-ins make settings for functions having exclusive relationships, the settings can be matched.

While in the fifth embodiment the function having higher priority is given priority in the matching process, this is merely an example and does not limit the present invention.

For example, the function of a later-called plug-in may be given priority. In this case, the matching unit 514, with regard to the retained print setting and the print setting requested to be retained, which are sent from the retaining unit 513, may perform the matching process in which the print setting requested to be retained is given priority.

Further, for example, the function of an initially called plug-in may be given priority. In this case, the matching unit 514, with regard to the retained print setting and the print setting requested to be retained, which are sent from the retaining unit 513, may perform the matching process in which the retained print setting is given priority.

Further, for example, when a setting is made for a function having an exclusive relationship, a default setting may be resumed. In this case, the matching unit 413, when the retained print setting and the print setting requested to be retained have an exclusive relationship, may return the retained setting back to the default setting.

Modification

The present invention is not limited to any of the foregoing embodiments, and various modifications are possible. For example, the foregoing embodiments may be combined, or a part of any of the foregoing embodiments may be combined with another embodiment. For example, the third embodiment may be combined with the fourth embodiment and/or the fifth embodiment. Alternatively, the feature of cancelling the calling of a plug-in according to the second embodiment may be combined with the fourth embodiment and/or the fifth embodiment.

Hardware Structure

Figure 20:
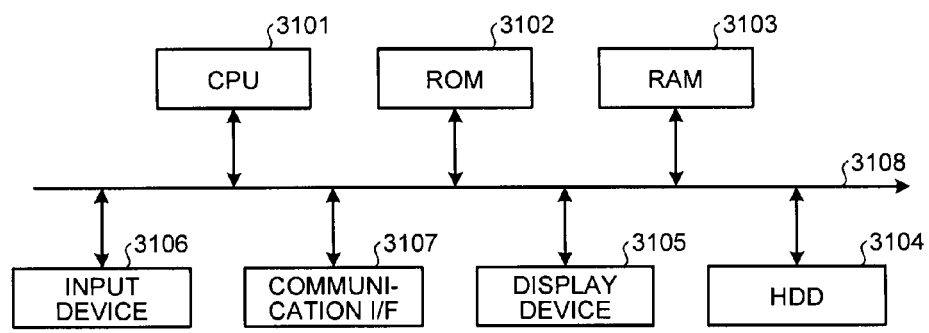
FIG. 20 is a block diagram of an example of a hardware structure of a PC.

FIG. 20 illustrates a hardware structure of the PC according to the embodiments described above. As illustrated in FIG. 20, the PC includes a CPU 3101, a ROM 3102, a RAM 3103, a hard disk drive (HDD) 3104, a display device 3105 such as a display unit, an input device 3106 such as a keyboard and mouse, a communication I/F 3107, and a bus 3108 that connects the various units. The hardware structure may be provided by a conventional computer.

The printer driver (program) executed by the PC according to the embodiments described above may be recorded and provided in a computer-readable recording medium, such as a CD-ROM, flexible disc (FD), a CD-R, or a digital versatile disk (DVD), in a file of installable format or executable format.

Preferably, the printer driver executed by the PC according to the embodiments described above may be stored in a computer connected to a network, such as the Internet, so that the printer driver can be downloaded and provided via the network. Further preferably, the printer driver executed by the PC according to the embodiments described above may be provided or distributed via a network such as the Internet.

Preferably, the printer driver executed by the PC according to the embodiments described above may be provided by being incorporated in a ROM or the like in advance.

The printer driver executed by the PC according to the embodiments described above may have a modular structure including the various units described above (the core unit 111 and the various plug-ins). In actual hardware terms, the CPU 3101 may read the printer driver from the storage medium and execute the printer driver so that the various units can be loaded on the RAM 3103, thereby generating the core unit 111 and the various plug-ins on the RAM 3103.

According to the embodiments, development cost can be restrained.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
a core unit configured to control an external device that is communicatively connected to the information processing apparatus;
a calling unit that is included in the core unit and is configured to call, at a plurality of timings, a plug-in that enables the external device to implement a predetermined function when controlling the external device; and
a plug-in unit that includes a plurality of different plug-ins that enable the external device to implement their respective functions,
wherein the plug-in, when called by the calling unit, determines whether the plug-in is called at a specific timing, and if the plug-in is called at the specific timing, the plug in interrupts a process related to the control of the external device performed by the core unit with a process related to the predetermined function provided by the plug-in, and
wherein the calling unit, when calling the plurality of plug-ins in order, determines whether a next plug-in is to be called, based on a plug-in that has already been called.

2. The information processing apparatus according to claim 1,
wherein the plug-in includes at least one of a function of generating an image output by the external device, a process of receiving from a user an operation input related to a setting of the external device, and a function of storing the input setting.

3. The information processing apparatus according to claim 1,
wherein the calling unit queries the plurality of plug-ins, identifies the plug-in that enables the external device to implement the predetermined function, and calls the identified plug-in.

4. The information processing apparatus according to claim 1, further comprising
a plug-in information storing unit configured to store therein plug-in information related to the functions provided by the plurality of plug-ins,
wherein the calling unit calls the plug-in that enables the external device to implement the predetermined function by referring to the plug-in information.

5. The information processing apparatus according to claim 1,
wherein the calling unit determines whether the next plug-in is to be called, based on whether the already-called plug-in is cancelled.

6. The information processing apparatus according to claim 5, further comprising
a priority information storing unit configured to store therein priority information that defines priority of each of the plurality of plug-ins,
wherein the calling unit further determines whether the next plug-in is to be called by referring to the priority information.

7. The information processing apparatus according to claim 1,
wherein the calling unit calls the plurality of plug-ins in order, and
wherein the information processing apparatus further comprises a matching unit configured to match different settings for a same function, which are set by the plural plug-ins, and retain the matched setting.

8. The information processing apparatus according to claim 7, further comprising
a priority information storing unit configured to store therein priority information that defines priority of each of the plurality of plug-ins,
wherein the matching unit matches the different settings based on the priority information.

9. The information processing apparatus according to claim 7,
wherein each of the plurality of plug-ins interrupts the process related to the control of the external device performed by the core unit with a process related to the predetermined function provided by its corresponding plug-in after reflecting the setting set by the already-called plug-in.

10. The information processing apparatus according to claim 9, further comprising:
a setting reflecting information storing unit configured to store therein setting reflecting information that defines whether the setting set by the already-called plug-in is to be reflected in each of the plurality of plug-ins,
wherein each of the plurality of plug-ins refers to the setting reflecting information and, when the setting reflecting information defines that the setting is to be reflected in the plug-in, interrupts the process related to the control of the external device performed by the core unit with the process related to the predetermined function provided by its corresponding plug-in after reflecting the setting set by the already-called plug-in, but when the setting reflecting information defines that the setting is not to be reflected in the plug-in, interrupts the process related to the control of the external device performed by the core unit with the process related to the predetermined function provided by its corresponding plug-in without reflecting the setting by the already-called plug-in.

11. The information processing apparatus according to claim 1, further comprising
a matching unit configured to perform a matching process on settings for functions having exclusive relationships, which are set by the plurality of plug-ins according to a predetermined matching rule; and
a retaining unit configured to retain the matched setting subjected to the matching process.

12. The information processing apparatus according to claim 11,
wherein each of the plurality of plug-ins interrupts the process related to the control of the external device performed by the core unit with a process related to the predetermined function provided by its corresponding plug-in after reflecting the setting set by the already-called plug-in.

13. The information processing apparatus according to claim 12, further comprising:
a setting reflecting information storing unit configured to store therein setting reflecting information that defines whether the setting set by the already-called plug-in is to be reflected in each of the plurality of plug-ins,
wherein each of the plurality of plug-ins refers to the setting reflecting information and, when the setting reflecting information defines that the setting is to be reflected in the plug-in, interrupts the process related to the control of the external device performed by the core unit with the process related to the predetermined function provided by its corresponding plug-in after reflecting the setting set by the already-called plug-in, but when the setting reflecting information defines that the setting is not to be reflected in the plug-in, interrupts the process related to the control of the external device performed by the core unit with the process related to the predetermined function provided by its corresponding plug-in without reflecting the setting by the already-called plug-in.

14. The information processing apparatus according to claim 1,
wherein each of the plurality of plug-ins interrupts the process related to the control of the external device performed by the core unit with a process related to the predetermined function provided by its corresponding plug-in after reflecting the setting set by the already-called plug-in.

15. The information processing apparatus according to claim 14, further comprising:
a setting reflecting information storing unit configured to store therein setting reflecting information that defines whether the setting set by the already-called plug-in is to be reflected in each of the plurality of plug-ins,
wherein each of the plurality of plug-ins refers to the setting reflecting information and, when the setting reflecting information defines that the setting is to be reflected in the plug-in, interrupts the process related to the control of the external device performed by the core unit with the process related to the predetermined function provided by its corresponding plug-in after reflecting the setting set by the already-called plug-in, but when the setting reflecting information defines that the setting is not to be reflected in the plug-in, interrupts the process related to the control of the external device performed by the core unit with the process related to the predetermined function provided by its corresponding plug-in without reflecting the setting by the already-called plug-in.

16. The information processing apparatus according to claim 1, wherein the plug-in is called for DocumentEvent instances associated with operation of the external device.

17. A computer program product comprising a non-transitory computer readable medium including programmed instructions, wherein the instructions, when executed by a computer for controlling an external device communicatively connected thereto, cause the computer to execute:
calling, at a plurality of timings, a plug-in that enables the external device to implement a predetermined function when controlling the external device;
causing the plug-in that is called in the calling to determine whether the plug-in is called at a specific timing, and if the plug-in is called at the specific timing, causing the plug-in to interrupt a process related to the control of the external device with a process related to the predetermined function provided by the plug-in; and
storing a plurality of different plug-ins that enable the external device to implement their respective functions,
wherein the plug-in, when called by the calling unit, determines whether the plug-in is called at a specific timing, and if the plug-in is called at the specific timing, the plug in interrupts a process related to the control of the external device performed by the core unit with a process related to the predetermined function provided by the plug-in, and
wherein, when the calling includes calling the plurality of plug-ins in order, the calling also includes determining whether a next plug-in is to be called, based on a plug-in that has already been called.

18. The computer program product according to claim 17, wherein the plug-in is called for DocumentEvent instances associated with operation of the external device.

* * * * *